United States Patent [19]
Giardina et al.

[11] 3,752,953
[45] Aug. 14, 1973

[54] METHOD FOR THE AUTOMATIC ELECTRIC WELDING OF ANGLE METAL PLATES THROUGH THREE ARCS IN SERIES, IN A SINGLE PASSING OPERATION

[75] Inventors: Giovanni Giardina, Venezia-Mestre; Giovanni Lombardo, Genova-Sestri, both of Italy

[73] Assignee: Italsider S.p.A., Genova, Italy

[22] Filed: Oct. 14, 1971

[21] Appl. No.: 189,216

[30] Foreign Application Priority Data
Oct. 31, 1970 Italy .............................. 13003 A/70

[52] U.S. Cl. ............................ 219/137, 219/126
[51] Int. Cl. .............................................. B23k 9/00
[58] Field of Search ................... 219/137, 130, 74, 219/75, 126

[56] References Cited
UNITED STATES PATENTS

| | | | |
|---|---|---|---|
| 3,634,650 | 1/1972 | Kaisha | 219/137 |
| 3,596,051 | 7/1971 | Kaisha | 219/137 |
| 2,437,840 | 3/1948 | Steward et al. | 219/137 |
| 3,182,179 | 5/1965 | Anderson, Sr. | 219/137 |
| 3,171,944 | 3/1965 | Linnander | 219/137 |
| 2,436,387 | 2/1948 | Harter et al. | 219/137 X |

Primary Examiner—J. V. Truhe
Assistant Examiner—Gale R. Peterson
Attorney—W. G. Fasse

[57] ABSTRACT

A method of automatically welding uncalked angle metal plates along a seam in which three spaced apart electrodes are moved along the seam and in which the first electrode is supplied with direct current and the trailing electrodes are supplied with alternating current.

8 Claims, 14 Drawing Figures

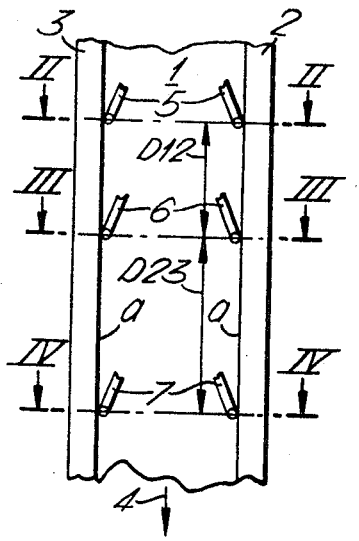
Fig. 1.
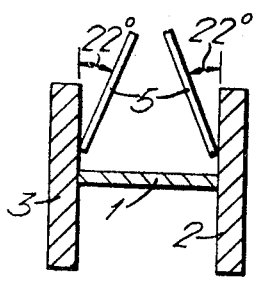
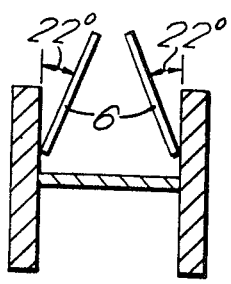
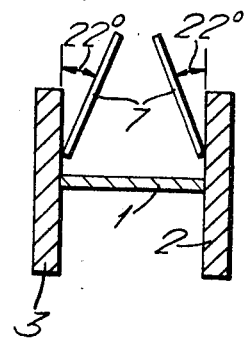
Fig. 2.   Fig. 3.   Fig. 4.

3,752,953

METHOD FOR THE AUTOMATIC ELECTRIC WELDING OF ANGLE METAL PLATES THROUGH THREE ARCS IN SERIES, IN A SINGLE PASSING OPERATION

BACKGROUND OF THE INVENTION

The present invention relates to a method for the automatic electric welding of angle metal plates using three arcs in series, in a single passing operation. Several methods are known for the automatic electric welding of metal plates, particularly angle-shaped plates.

A method, which may now be considered as conventional, comprises, in the welding of plates above a given thickness, the calking of the edges and then several successive passing operations until completing the required seam.

Such a method is essentially the adaption of conventional welding methods performed by hand, to a method of automatic welding.

Said known method, though offering remarkable advantages when first used, have however the disadvantage of the work necessary for the calking in a first time and then the need of making the operative head pass along the seam to be completed as many times as there are partial seams which must constitute the final seam. In order to make said automatic welding simpler and cheaper, endeavours were made on one hand for avoiding the calking of the edges to be welded and on the other hand for reducing the number of the passing operations necessary for obtaining the required final seams.

It is to be noted that the calking operation on the edges to be welded may be avoided only for plates having thicknesses smaller than given values, which each time depend on the method used for the welding operation. Further, the reduction of the passing operations may cause an undesired thickening of the grains of the deposited material.

In the above method there is the need for making the welding head pass several times along the edges to be joined, and this does not permit the continuous treatment of more pieces contiguous in series. To this end a more recent known technique provides a system of automatic electric welding known on the market as TANDEM, which allows the welding of uncalked adjacent edges in a single passing operation of a welding head comprising three arcs arranged behind each other, the second of which completes the welding seam started by the first one, when the first deposit has not yet cooled.

Besides, it is to be noted that the above problems arising in the case of automatic electric welding in general, are more serious in the case of the automatic welding electric of an angle of not positioned pieces. In fact, in such a case, the above TANDEM welding is restricted to welding seams having at the maximum a 10 mm side. As a matter of fact, the TANDEM welding is equivalent to a welding performed by two seams and thus each of them cannot exceed given sections; in the contrary case, two inconveniences occur: on one hand the metallurgic characteristics of the seam become worse, on the other hand it becomes substantially impossible to obtain a symmetric seam, as the bath tends to slide downwards.

OBJECT OF THE INVENTION

Object of the present invention is to overcome the restrictions of the above welding method, allowing to increase of up to about 50 percent in the maximum size of the welding seam obtainable by said method. The claimed method has further the object of increasing considerably the welding speed.

Such an object was achieved by using, as a base for the claimed method, three arcs arranged in series behind each other. It is to be noted that the use of more than two arcs in series is known in the art of flat welding. The latter, however, has less problems it is always easy enough to obtain a final seam of uniform and symmetric section. In the case of angle welding, as said above, in addition to the problem of obtaining a perfect seam from the point of view of the metallographic feature, there is also the problem of avoiding that, together with the increase of the seam size, the mass forces of the liquid bath may overcome the superficial forces, tending to distribute the triangular seam in an unsymmetrical manner.

Within the above limits, the claimed method has solved said problems through a suitable selection of the parameters in the welding operation.

SUMMARY OF THE INVENTION

The method of automatic electric welding of uncalked angle metal plates, through a plurality of arcs in series, according to the invention comprises three arcs in series, whose electrodes are inclined of about 14°–30° with respect to the vertical and are spaced the first from the second of about 30–60 mm and the second from the third about double that distance.

Said first arc is fed with direct current, while said second and third ones are fed with alternating current; the operative speed being between 120 and 50 cm/min for obtaining welding seams with a side from 6 to 15 mm.

The diameter of said first electrode is between 3.5 and 4.5 mm, while the one for the second and third electrodes is between 2.7 and 3.7 mm.

According to the invention, said first arc is fed with a direct current of 600–650 amperes at a voltage of between 28 and 32 volts, while said second and third arcs are fed with an alternating current of 380–450 amperes at a voltage of between 28 and 35 volts.

For obtaining an 8 mm side welding seam, the following parameters are used according to the invention:
— thermal yield of the first arc (D.C.):9700 joules/cm;
— diameter of the first electrode: 4 mm;
— distance between the first and the second electrode:40mm;
— thermal yield of the second arc (A.C.): 7200 joules/cm;
— diameter of the second electrode: 3.2 mm;
— distance between the second and third electrode:65 mm;
— thermal yield of the third arc: 7450 joules/cm;
— diameter of the third electrode: 3.2 mm;

For obtaining a 10 mm side welding seam the following parameters are used according to the invention:
— thermal yield of the first arc (D.C.): 13100 joules/cm;
— diameter of the first eletrode: 4 mm;
— distance between the first and second electrode:40 mm;

- thermal yield of the second arc (A.C.): 9,500 joules/cm;
- diameter of the second electrode: 3.2 mm;
- distance between the second and third eletrode: 85 mm;
- thermal yield of the third arc (A.C.): 10100 joules/cm;
- diameter of the third eletrode: 3.2 mm, For obtaining a 13 mm side welding seam the following parameters are used according to the invention:
- thermal yield of the first arc (D.C.): 22300 joules/cm;
- diameter of the first electrode: 4 mm;
- distance between the first and second electrode: 50 mm;
- thermal yield of the second arc (A.C.): 14400 joules/cm;
- diameter of the second electrode: 3.2 mm;
- distance between the second and third electrode: 85 mm;
- thermal yield of the third arc (A.C.): 7200 joules/cm;
- diameter of the third electrode: 3.2 mm.

With the method according to the present invention the axis of the first electrode is spaced of 2 mm from the lower face of the plane passing through the foot of the inner face of the vertical plate, and inclined of 22° with respect to vertical; the axes of the second and third electrodes pertaining to said plane.

In the method according to the invention the axis of the first electrode is spaced of 2 mm from the lower face of the plane passing through the foot of the inner face of the vertical plate, and inclined of 22° with respect to the vertical; said second and third electrodes being spaced of 3.5 mm from the lower face of said plane and of 3.5 mm from the upper face of the same plane respectively.

BRIEF DESCRIPTION OF THE DRAWINGS

In order that the invention may be clearly understood, some embodiments of the present invention selected by way of example only, will now be described with reference to the accompanying drawings wherein:

FIG.1 is a plan view of a portion of an H-shaped beam whose two flatbands are to be simultaneously welded to the core by using the claimed method for the connection of both the left and the right edges to the respective flatbands;

FIGS.2,3,4 are sections along the planes II—II, III,III and IV—IV respectively of FIG.1;

FIGS. 5a, 5b and 5c are enlarged details of FIGS.2,3 and 4, referring to the case when the final seam has a side 1 corresponding to 13 mm;

DESCRIPTION OF THE PREFERRED EMBODIMENTS

Figure 5:
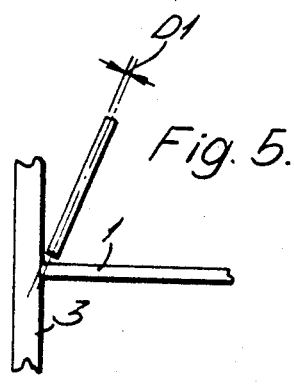
FIGS.5,6,7 are enlarged details of FIGS.2,3 and 4, referring to the case when the final seam has a side 1 corresponding to 8 or to 10 mm.
Figure 5A:
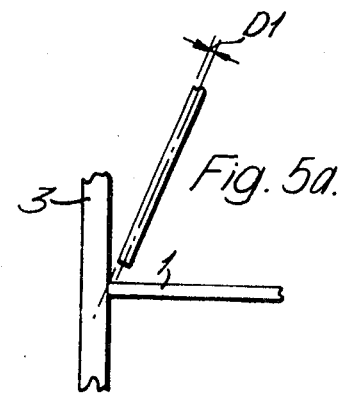
Figure 6:
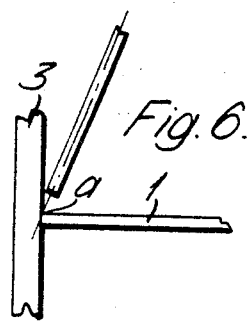
Figure 6A:
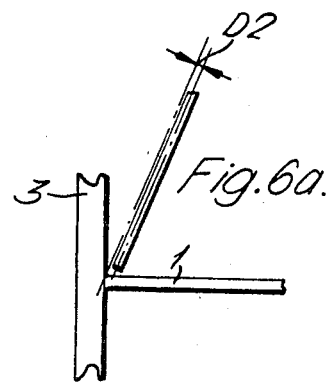
Figure 7:
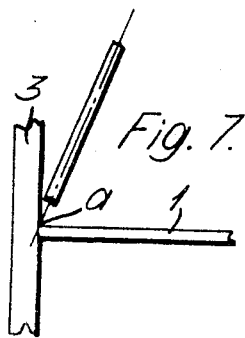
Figure 7A:
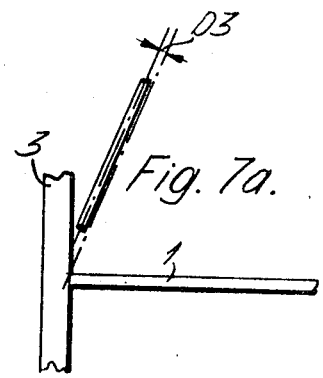

The H-shaped beam consisting of flatbands 2 and 3 and the core 1, moves with respect to the welding head according to the direction of arrow 4. Each welding head comprises a first, second and third arc shown diagrammatically in FIG.1, by the respective electrodes 5,6 and 7. As shown in FIG.1, in order to avoid inclusions at their lower end, said electrodes are slightly inclined in the direction of the forward movement of the workpiece to be welded.

It is to be noted that the electrodes diagrammatically shown in the drawings serve to define the position of the axes of the various electric arcs.

As shown in FIGS. 2 to 4, the electrodes 5 to 7 are inclined of about 22° with respect to the vertical; as for the distance $D_i$ between the axis of the electrode and a line parallel thereto extending through the intersection line between the orthogonal faces of the two pieces to be welded, the size of the side 1 of the welding seam. Similarly, as for the distances $D_{12}$ and $D_{23}$ between the axis of the first and second electrodes and the axis of the second and third electrodes respectively, the side "1" of the welding seam is to be taken into account.

8 × 8 mm seam
$D_1 = 2$ mm
$D_2 = 0$ mm
$D_3 = 0$ mm
$D_{12} = 40$ mm
$D_{23} = 65$ mm 10 × 10 mm seam
$D_1 = 2$ mm
$D_2 = 0$ mm
$D_3 = 0$ mm
$D_{12} = 40$ mm
$D_{23} = 85$ mm 13 × 13 mm seam
$D_1 = 2$ mm
$D_2 = 3.5$ mm
$D_3 = -3.5$ mm
$D_{12} = 50$ mm
$D_{23} = 85$ mm In all the three above examples, the first electrode 5 was fed with direct current, while the second electrode 6 and the third one 7 were fed with alternating current.

The conditions of the thermal yield and the operative data, besides those above reported, are given in the following tables Nos. 1,2 and 3 which refer to welding seams with a side of 8, 10, 13 mm respectively.

TABLE No.1

8 × 8 mm seam

|  | Thermal yield (joules/cm) | dia. (mm) |
| --- | --- | --- |
| 1st electrode (D.C.) | 9700 | 4 |
| 2nd electrode (A.C.) | 7200 | 3.2 |
| 3rd electrode (A.C.) | 7450 | 3.2 |

Distance between the 1st and 2nd electrode: 40 mm
Distance between the 2nd and 3rd electrode: 65 mm

TABLE No.2

10 × 10 mm seam

|  | Thermal yield (joules/cm) | dia. (mm) |
| --- | --- | --- |
| 1st electrode (D.C.) | 13100 | 4 |
| 2nd electrode (A.C.) | 9500 | 3.2 |
| 3rd electrode (A.C.) | 10100 | 3.2 |

Distance between the 1st and 2nd electrode: 40 mm
Distance between the 2nd and 3rd electrode: 85 mm

TABLE No.3
13 × 13 mm seam

|  | Thermal yield (joules/cm) | dia. (mm) |
|---|---|---|
| 1st electrode (D.C.) | 22300 | 4 |
| 2nd electrode (A.C.) | 14400 | 3.2 |
| 3rd electrode (A.C.) | 14400 | 3.2 |

Distance between the 1st and 2nd electrode: 50 mm
Distance between the 2nd and 3rd electrode: 85 mm In order to check the mechanical and metallurgic characteristics of the weldings performed by the method according to the present invention, experimental tests were made with the following results:
8 × 8 mm seam

Test of the Breaks on Some Test Pieces

The tests had positive results as the seams resulted free of defects.

Test of Macrographies

The tests had a positive results, as the seam has a good geometry; the ratio between the depth of the groove and the hypothenuse of the seam is within the fixed value 0.75 ÷ 0.80 (see FIG.11) which is the best for obtaining weldings free of defects, as proved by the experience of the proprietors and of several national and foreign concerns and organizations.

The solidification occurred in a satisfying way, as shown by the dendrites which tend to come to the surface.

Finally, there occurred a refining action of the grains and thus an improvement in the metallurgic point of view. Such an action was emphasized by some macrographies effected on test pieces wherein only two deposits may be clearly seen: the first and the third, as the second was normalized by the successive one.

TEST OF HARDNESS

Figure 8:
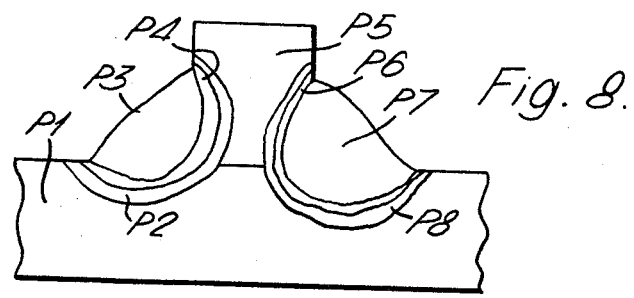
FIGS.8;9,10 show in an enlarged diagrammatic cross section the two double seams obtained by the claimed method when the side of said welding seam is corresponding to 8,10 and 13 mm respectively.

The hardnesses measured by means of a Rockwell scale B apparatus, gave satisfying results as, besides being within the standard limit, they are very homogeneous, and that is caused by the normalization effected following the deposit of material of the third electrode. The test of the hardnesses is given in FIG.8 and in the following table No.4.

TABLE 4
8 x 8 mm. seam

| Test No.: | P1 | P2 | P3 | P4 | P5 | P6 | P7 | P8 |
|---|---|---|---|---|---|---|---|---|
| 1 | 68 | 79 | 92 | 84 | 73 | 84 | 97 | 83 |
| 2 | 79 | 88 | 98 | 88 | 72 | 89 | 98 | 90 |
| 3 | 66 | 87 | 100 | 89 | 71 | 90 | 98 | 93 |
| 4 | 71 | 91 | 97 | 80 | 65 | 79 | 96 | 92 |
| 5 | 73 | 94 | 98 | 82 | 68 | 81 | 97 | 95 |

10 × 10 mm seam

Test of Breaks

The tests gave a positive result, as the seams are free of defects. The structure is good and fine.

Test of Macrographies

The tests gave positive results since, as in the case of the 8 × 8 mm seam, the seam has a good geometry and the groove depth is within the fixed limits. The solidification took place in a satisfying way and that is shown by the dendrites which tend to come to the surface, thus assuring an obstacle against the rising of heat cracks.

TEST OF HARDNESS

Figure 9:
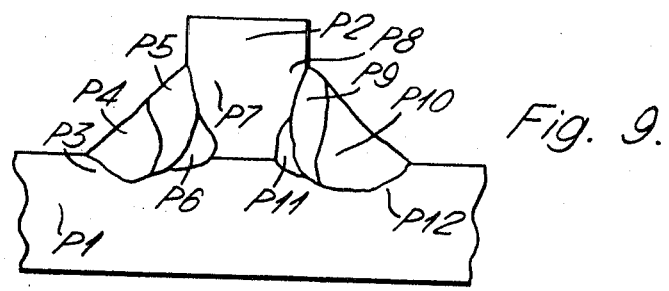

The hardnesses measured by a Rockwell scale B apparatus gave good results as they all are within the standard limit and are, in the various points checked, very homogeneous. The test of the hardnesses is given in the FIG.9 and in the following table No.5.

TABLE No.5
10 × 10 mm seam

| Test No. | P1 | P2 | P3 | P4 | P5 | P6 |
|---|---|---|---|---|---|---|
| 1 | 85 | 75 | 99 | 94 | 94 | 92 |
| 2 | 73 | 76 | 85 | 95 |  |  |
| 3 | 84 | 78 | 94 | 97 | 97 |  |
| 4 | 71 | 78 | 81 | 93 | 94 |  |

| Test No. | P7 | P8 | P9 | P10 | P11 | P12 |
|---|---|---|---|---|---|---|
| 1 | 81 | 81 | 95 | 96 | 92 | 99 |
| 2 | 87 | 87 |  | 97 |  | 86 |
| 3 | 85 | 83 | 95 | 98 |  | 98 |
| 4 | 83 | 85 | 94 | 93 | 92 | 82 |

13 × 13 mm seam

Test of Breaks the test gave a positive result as the welding seam is free of dafects;further the structure is regular and fine.

Test of Macrography

The test gave a positive result. The outer form of the seam is within the tolerance limits, as well as the groove depth. The dendrites, as in the preceding case, tend to come to the surface, assuring so an obstacle against the rising of heat cracks.

Test of Hardness

Figure 10:
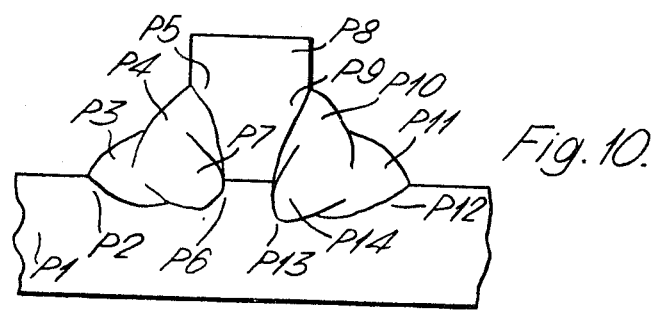

The hardness tests performed by a Rockwell scale B apparatus gave a good result as they all are within the standard limit and have not remarkable differences in the various points tested The hardness test is given in FIG.10 and in Table No.6.

TABLE No.6
13 × 13 mm seam

| Test No. | P1 | P2 | P3 | P4 | P5 | P6 | P7 |
|---|---|---|---|---|---|---|---|
| 1/1 | 61 | 84 | 89 | 88 | 75 | 79 | 82 |
| 1/2 | 53 | 88 | 91 | 88 | 82 | 79 | 85 |
| 2/1 | 60 | 82 | 90 | 88 | 78 | 78 | 85 |
| 2/2 | 60 | 80 | 86 | 87 | 74 | 78 | 85 |
| 3/1 | 65 | 82 | 88 | 87 | 79 | 78 | 90 |
| 4/1 | 64 | 82 | 89 | 90 | 80 | 74 | 87 |
| 4/2 | 67 | 84 | 90 | 89 | 80 | 79 | 85 |

| Test No. | P8 | P9 | P10 | P11 | P12 | P13 | P14 |
|---|---|---|---|---|---|---|---|
| 1/1 | 59 | 73 | 89 | 92 | 79 | 83 | 85 |
| 1/2 | 61 |  |  |  |  |  |  |
| 2/1 | 62 | 77 | 89 | 91 | 83 | 78 | 85 |
| 2/2 | 63 | 72 | 88 | 92 | 86 | 78 | 84 |
| 3/1 | 68 | 82 | 87 | 91 | 84 | 83 | 87 |
| 4/1 | 66 | 79 | 89 | 89 | 82 | 83 | 88 |
| 4/2 | 64 | 79 | 90 | 89 | 83 | 83 | 88 |

In short, the advantages obtainable by the use of the welding method named TRIARC are the following:

a. with the same sizes of the seam it is possible to attain welding speeds which, with respect to the present TANDEM method, present an increase of about 20 percent for the 8 × 8 mm seam, and of about 25 percent for the 10 × 10 mm seam. Thus, there is a corresponding increase in production.

b. there is the possibility of producing up to 13 × 13 mm seams, increasing the capacity of the installation with respect to the TANDEM system which at present is limited at the maximum to the 10 × 10 mm seam, without absolutely infirming the particularity of penetration which is characteristic of the present seams. Therefore, there is an increase of 35 ÷ 40 percent of the resistant section of the seam.

c. there is the possibility of obtaining better mechanical and metallurgic features caused by the addition of heat by the third arc, as the solidification structure has a finer grain for the action of normalization treatment of the third arc. Owing to that there is a higher uniformity in the hardnesses and thus in the mechanical characteristics of the seam and of the thermally altered area. Finally, the third arc cooperates in a determining way to obtain a very good solidification process. In fact, the dendrites place themselves in a correct way, tending to come regularly to the surface and limiting so at the utmost the rising of interdendritic and heat cracks.

Figure 11:
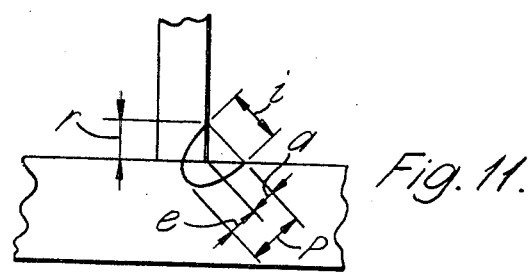
FIGS. 11 shows a further diagrammatic cross section of a welding seam according to the invention, wherein is shown the ratio between the welding seam side and the required penetration depth.

The reference letters used in FIG.11 have the following meaning:
$l$ = side of the seam
$i$ = hypothenuse of the seam
$e$ = depth of penetration
$P$ = groove of the seam
$a$ = height of the seam
$S$ = calculation section Further, the following relations appear:
$P/i = 0.75 \div 0.80$ -/- $S = (a+e/2)i$ It is to be understood that the invention is not limited to the examples shown. It is intended to cover all modifications and equivalents within the scope of the appended claims;

What we claim is:

1. The method of automatically welding uncalked angle metal plates along a seam, comprising arranging first, second and third electrodes in that order in spaced apart relationship along said seam, with the electrodes being inclined at an angle of between 14°–30° to the vertical, the first electrode being spaced from the second electrode between 30–60 mm and the second electrode being spaced from the third electrode substantially twice the distance between the first and second electrodes, providing relative movement between said electrodes and said metal plates in a direction parallel to said seam at a speed of between 50 and 120 cm/min. with each point of the seam passing the first, second and third electrodes, in that order, applying a direct loading current to said first electrode to provide a first welding arc, applying an alternating welding current to said second electrode with a current substantially one half the current applied to the first electrode to provide a second welding arc, and applying an alternating welding current to the third electrode to provide a third welding arc.

2. A method according to claim 1 wherein the diameter of the first electrode is between 3.5 and 4.5 mm, while the diameters of the second and third electrodes are between 2.7 and 3.7mm.

3. A method according to claim 1 wherein said first arc is fed with a direct current of 600–650 amperes at a voltage of between 28 and 32 volts, while the second and third arcs are fed with an alternating current of 380–450 amperes at a voltage of between 28–35 volts.

4. A method according to claim 3 for obtaining an 8 mm side seam comprising employing the following parameters:
thermal yield of the first arc (D.C.): 9700 joules/cm;
diameter of the first electrode: 4 mm;
distance between the first and second electrode: 40 mm;
thermal yield of the second arc (A.C.):7200 joules/cm;
diameter of the second electrode: 3.2 mm;
distance between the second and third electrode: 65 mm;
thermal yield of the third arc (A.C.): 7450 joules/cm;
diameter of the third electrode: 3.2 mm.

5. A method according to claim 3 for obtaining a 10 mm side seam comprising employing the following parameters:
thermal yield of the first arc (D.C.): 13100 joules/cm;
diameter of the first electrode: 4 mm;
distance between the first and second electrode: 40 mm;
thermal yield of the second arc (A.C.): 9500 joules/cm;
diameter of the second electrode: 3.2 mm;
distance between the second and third electrode: 85 mm;
thermal yield of the third arc (A.C.):10100 joules/cm;
diameter of the third electrode: 3.2 mm.

6. A method according to claim 3 for obtaining a 13 mm side seam comprising employing the following parameters:
thermal yield of the first arc (D.C.): 22300 joules/cm;
diameter of the first electrode: 4 mm;
distance between the first and second electrode: 50 mm;
thermal yield of the second arc (A.C.):14400 joules/cm;
diameter of the second electrode: 3.2 mm;
distance between the second and third electrode: 85 mm;
thermal yield of the third electrode (A.C.):14400 joules/cm;
diameter of the third electrode: 3.2 mm.

7. A method as claimed in claim 4 wherein the axis of the first electrode is spaced 2 mm from the lower face of the plane passing through the foot of the inner face of vertical plate, and inclined 22° with respect to the vertical; wherein further the axes of said second and third electrodes pertain to said plane.

8. A method according to claim 6 wherein the axis of the first electrode is spaced 2 mm from the lower face of the plane passing through the foot of the inner face of a vertical plate, and inclined 22° with respect to the vertical; and further wherein the second and third electrodes are spaced 3.5 mm from the lower face of said plane and 3.5 mm from the upper face of the same plane respectively.

* * * * *